P. B. TYLER, W. M. CHANDLER, & L. F. STANDISH,

Assignors, by mesne assignments, to G. SELDEN.

Pocket Lighting Device.

No. 7,927. Reissued Oct. 23, 1877.

WITNESSES

Frank L. Ourand

Alexander Mahon

Inventor

Geo Selden assignee of

Tyler, Chandler & Standish

UNITED STATES PATENT OFFICE.

GEORGE SELDEN, OF ERIE, PA., ASSIGNEE, BY MESNE ASSIGNMENTS, OF PHILOS B. TYLER, WM. M. CHANDLER, AND L. F. STANDISH.

IMPROVEMENT IN POCKET LIGHTING DEVICES.

Specification forming part of Letters Patent No. 50,860, dated November 7, 1865; Reissue No. 7,927, dated October 23, 1877; application filed October 16, 1877.

DIVISION A.

*To all whom it may concern:*

Be it known that PHILOS B. TYLER, WILLIAM M. CHANDLER, and L. F. STANDISH did invent certain new and useful Improvements in Pocket Lighting Devices, of which the following is a full, clear, and exact description, reference being had to the accompanying drawings, making part of this specification, in which—

Figure 2:
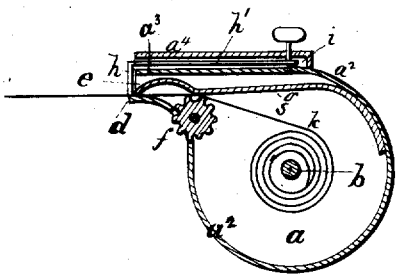
Figure 1:
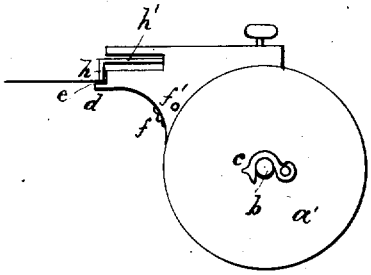
Figure 4:
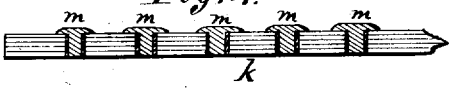
Figure 3:
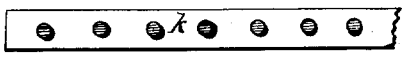

Figure 1 is a side elevation of the improved lighter. Fig. 2 represents the same in section. Fig. 3 is a rear view of a portion of one of the repeating-matches employed, and Fig. 4 represents a longitudinal section through the same.

Similar letters of reference denote corresponding parts wherever used.

The invention relates to a novel case for containing a repeating or continuous match, and to the means for feeding and igniting said match; and consists, first, in a novel construction of lighting device, adapted to be carried in the pocket, and provided with a magazine or chamber for containing a repeating-match.

It further consists in the combination, in a pocket lighting device, of a repeating-match, a case or shell for inclosing the same, and means for igniting said match at will.

It further consists in the combination, with the inclosing case or shell of the pocket lighting device, of a feed-wheel or equivalent device for feeding the repeating-match, as required.

It further consists in providing the case or shell of a pocket lighting device with a nose-piece, over which the repeating-match is fed, and which serves to support the repeating-match against the action of the igniting device.

It further consists in certain details of construction and arrangement of the parts of the pocket lighting device, as hereinafter explained.

In the accompanying drawings, $a$ $a^1$ represent a case or shell, made in the form of a shallow box, one side or plate, $a$, thereof being provided on its edge with a flange or rim, $a^2$, projecting on one side, and forming a chamber or magazine for containing the repeating-match or tape, and which, when in place, is covered by a hinged or removable cover, $a^1$.

The plate or side $a$ has a pin or arbor, $b$, secured to it, arranged about central to the magazine or chamber, and which projects through a perforation in the cover $a^1$; and a hook, $c$, pivoted on the cover $a^1$, and engaging with the projecting end of the pin or arbor $b$, serves to hold the cover in place.

The Figs. 1 and 2 of the drawing show a convenient form of case for general use, representing it as approximating a circular form, or, rather, that of a short cylinder, provided at $d$ with what may be termed a "nose-piece," or eccentric extension, and an opening or outlet at $e$, through which the repeating-match is fed outward, as desired. The lower wall or lip of this outlet $e$ extends slightly beyond the upper wall $a^3$, and forms a nose-piece, $d$, over which the repeating-match passes as it is fed outward, and which serves to support said match against the action of the device for igniting the match.

At a point near the outlet-passage $e$ the case or shell $a$ is provided with a toothed wheel, $f$, or equivalent device for feeding the match outward, the shaft of said wheel being journaled in the side walls or plates of the case or outlet-passage, as shown at $f'$. On the inner side of the flange or rim $a^2$, opposite to the wheel $f$, is secured a spring, $g$, which overhangs the feed-wheel $f$, and serves as a guiding-apron for holding the repeating-match or tape in contact with the wheel, insuring the endwise or feeding movement of said match or tape between the two when the wheel is rotated.

Directly over the nose-piece $d$ is a device, $h$, for igniting the repeating-match, consisting of an angular lip or projection on a vibrating arm, $h'$, which, at its rear end, is rigidly connected with a rock shaft or pin having its bearings in the case $a$ or walls $a^2$ $a^4$, and provided with a handle or thumb-piece on its outer end, outside of the case or shell, by means of which the igniting device $h$ may be operated for igniting the match.

The vibrating arm $h'$ is inclosed and protected by being placed within a compartment or chamber, *i*, as shown.

The lighter-case, thus constructed, is designed to inclose and protect a match composed of a strip of paper or tape, *k*, provided either with a continuous strip of igniting material or with such material arranged in spots or pellets at regular intervals in its length, as shown at *m*, Figs. 3 and 4, and which, for adapting it to be placed in compact shape in the case *a*, is rolled up, as shown in Fig. 2. Any suitable kind or preparation of igniting material may be used upon the tape or strip of paper, and, where it is used in connection with a tape or wick of other material than paper, said wick or tape may be saturated with stearine or other suitable material, adapting it to be readily ignited by the igniting pellets or strip.

The tape or wick is shown perforated at regular intervals to adapt it to more firmly retain the igniting material.

In operation the wick or tape is fed outward by means of the wheel *f*, until a pellet or portion of the igniting material rests on the nose-piece *d*, when it is ignited by the vibration of the arm *h'* and igniting device *h*, and in turn serves to ignite the wick or tape, which may then be used for any purpose to which it is applicable.

The wick will continue to burn as long as any portion of it projects beyond the outlet passage *e* or nose-piece *d*, and may be fed outward and allowed to burn as long as required, when, by withdrawing it or allowing it to burn until all that projects is consumed, the air will be excluded from the remaining portion, and the fire will be extinguished.

The operation may be repeated until the entire repeating-match is consumed, when, by removing the cover $a^1$, or opening the case *a*, a new match or tape may be inserted.

Having now described the invention of the said TYLER, CHANDLER, and STANDISH, I would state that I do not wish to be limited to any particular igniting material in the manufacture of the repeating-match, nor to the use of a tape or wick saturated with stearine, as any suitable material may be employed, both for igniting the wick or tape and saturating the same, such as will adapt it to be readily ignited. Nor do I wish to be limited to the specific form of case shown, nor to the particular construction and arrangement of the devices for feeding and igniting the repeating-match, the form and arrangement shown being such, however, as to adapt the lighter to general use, and constituting a convenient and compact form for carrying in the pocket.

Having now described the invention, what is claimed under this division of the application, and sought to be secured by Letters Patent, is—

1. The combination, in a pocket lighting device, of an adjustable strip or tape, provided at intervals with spots or pellets of igniting material, and a case or magazine for inclosing said strip or tape, as described.

2. The combination, in a pocket lighting device, of an adjustable wick or tape, adjustable igniting-pellets for igniting said wick, arranged within and inclosed by a case or shell, and devices for operating the same from the outside of said case or shell.

3. The combination, in a pocket lighting device, of an inclosing case or shell, an adjustable repeating-match, and toothed wheel or roller for feeding said match outward, as required.

4. In a pocket lighting device a magazine or case for inclosing a strip or coil of repeating-match, provided with a nose-piece, over which said match passes in being fed outward, and which serves to uphold the match against the action of the igniting device.

5. In a pocket lighting device a case or shell for containing the repeating-match, provided with a nose-piece and an igniting device, between which two parts the repeating-match is ignited.

6. In combination, in a pocket lighting device, the nose-piece over which the match passes, the roller, or equivalent thereof, for moving the match, and the igniter, or the equivalent thereof, as and for the purpose described.

7. In combination, in a pocket lighting device, the case for containing the match, the nose-piece, the roller for moving the match, and the igniter, or the equivalent of them, as and for the purpose described.

GEO. SELDEN.

Witnesses:
ALEXANDER MAHON,
JOHN G. CENTER.